SEYMOUR OPPENHEIMER
ALBIN F TURBAK
INVENTOR.

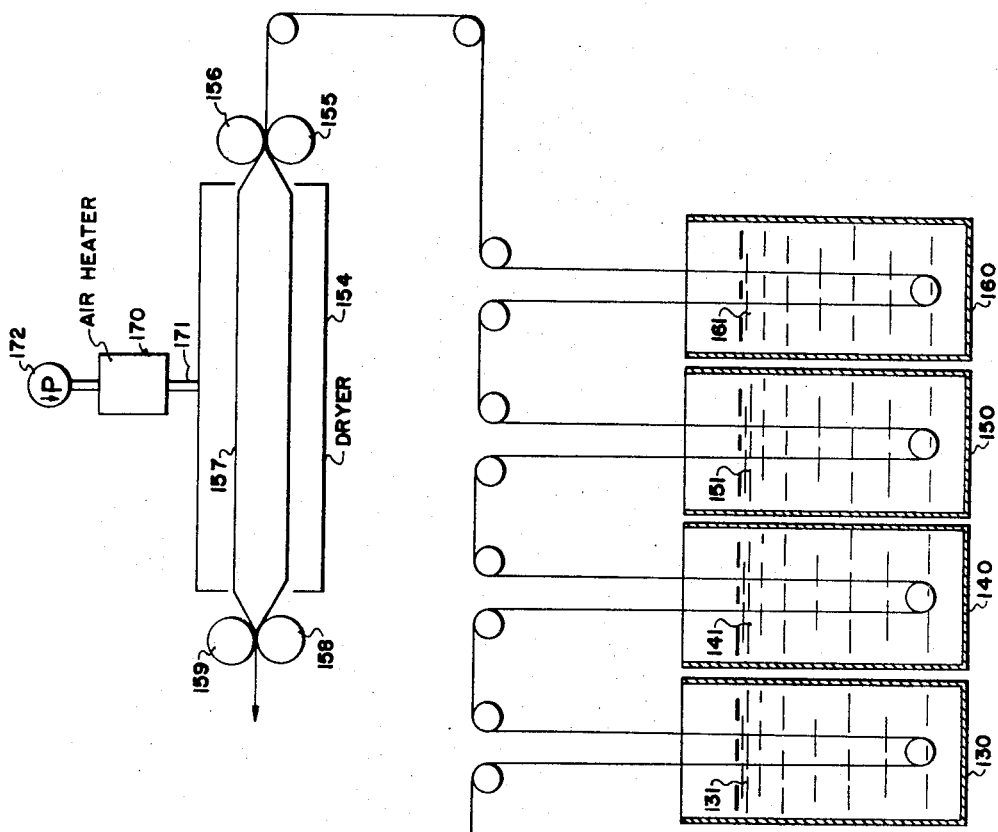
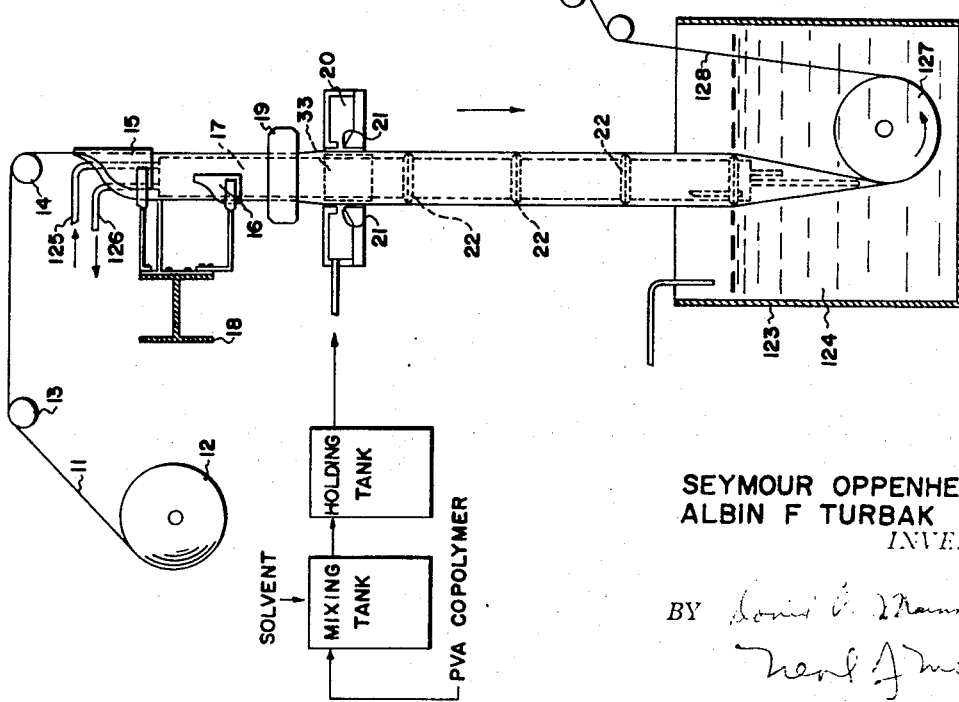
FIG. 2
SEYMOUR OPPENHEIMER
ALBIN F TURBAK
INVENTOR.
BY
their attorney July 25, 1972  S. OPPENHEIMER ET AL  3,679,436
PREPARATION OF FIBROUS REINFORCED SAUSAGE-TYPE
CASINGS FROM ORGANIC SOLVENT SOLUBLE
POLYVINYL ALCOHOL RESINS
Filed May 26, 1969  4 Sheets-Sheet 4

BY
their attorney

United States Patent Office 3,679,436
Patented July 25, 1972

3,679,436
PREPARATION OF FIBROUS REINFORCED SAUSAGE-TYPE CASINGS FROM ORGANIC SOLVENT SOLUBLE POLYVINYL ALCOHOL RESINS
Seymour Oppenheimer, Chicago, and Albin F. Turbak, Danville, Ill., assignors to Tee-Pak, Inc., Chicago, Ill.
Filed May 26, 1969, Ser. No. 827,594
The portion of the term of the patent subsequent to Feb. 8, 1989, has been disclaimed
Int. Cl. A22c 13/00
U.S. Cl. 99—176          12 Claims

ABSTRACT OF THE DISCLOSURE

A novel fibrous casing for packaging sausages and similar products comprises a saturating tissue impregnated with a continuous film of an insolubilized, film-forming polyvinyl alcohol resin. The casing is preferably prepared by impregnating a suitable saturating tissue with an organic solvent solution of a polyvinyl alcohol resin and then insolubilizing the resin as a film on the tissue, e.g., by contact with a coagulation (acid, salt, or non-solvent liquid) bath, by evaporation of the solvent, etc. Further insolubilization of the resin film may be effected by reacting the resin with a suitable cross-linking agent, viz formaldehyde. Resin impregnated-saturating tissue may be formed directly into a tubular casing or initially may be produced as a sheet which is slit to appropriate width and then formed into a tubular casing in a separate seaming operation. Casings are preferably formed using long fiber hemp papers as the saturating tissues and using organic solvent soluble, film-forming polyvinyl alcohol resins having a hydroxyl group D.S. of at least 20%, e.g., in the range of from about 25% to about 99.99%.

BACKGROUND OF THE INVENTION

Field of the invention

This invention relates to new and improved sausage-type casings and the methods of preparing the same. More particularly, the invention is concerned with the preparation of casings for packaging sausages and similar products using organic solvent soluble, film-forming polyvinyl alcohol resins. The invention is primarily directed to the production of novel fibrous casings comprising a tubular insolubilized polyvinyl alcohol resin film reinforced with a fibrous web of saturating tissue, preferably a long fiber hemp paper tissue.

Natural casings are prepared from the intestines of various edible animals, primarily cattle, hogs, and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking.

Prior to about 1925, substantially all sausage casings were natural casings prepared from animal intestines. Since that time, there have been developed several types of synthetic sausage casings. Some artificial sausage casings are prepared by reconstitution of a tubular film from animal hide fibers to yield a tough collagenous film. The major proportion of artificial casings, however, are prepared from regenerated cellulose, preferably by the viscose process, although some casings are manufactured by the cuprammonium process and also by denitration of extruded cellulose nitrate tubes.

There has been a considerable consumer acceptance of pre-sliced sausages, such as bologna, salami, etc., which are sold in the form of relatively small conveniently sized packages, each package containing a small predetermined quantity of sausage in the form of a fixed number of slices. The reason for this is that the slicing of the sausage is performed mechanically, thus yielding a product of uniform thickness for ease of packaging. In order to provide a predetermined number of slices in a package of a given weight, it is essential that the diameter of the sausage be carefully controlled. In the prepartion of sausages by the meat packer, a sausage emulsion is inserted into the sausage casing which is subsequently tied off at each end and cooked or cooked and smoked. In order to assure uniformity of size of the sausage slices, casings are provided to the trade known as fibrous casings. Fibrous casing is composed of cellulosic fibers, preferably in the form of a saturating tissue paper, which are impregnated and held together by regenerated cellulose. The paper used, preferably a long fiber hemp paper, is impregnated with viscose, formed into a tube, and treated in a coagulating and regenerating bath to regenerate cellulose within and upon the paper. The product is a fiber reinforced regenerated cellulose casing having relatively high strength and relatively low stretch.

Over a period of many years, cellulose casings have remained the most desirable and generally the most economical, in spite of the development of competing, cheaper plastics, because cellulose has properties of strength, both wet and dry, low stretch, and permeability to moisture vapor and smoke, which are required in the processing of sausage products. For example, some plastics, such as polyethylene, polyvinyl chloride, etc., which are easy to process in film form have never produced satisfactory sausage casings because of a deficiency in smoke or moisture vapor permeability. On the other hand, most other common plastic packaging films, including polyvinyl alcohol, while having the advantage of being easily formed into films which have a high moisture vapor and smoke permeability are too stretchy, particularly when wet, for use in forming sausage casings. For polyvinyl alcohol films, for instance, a stretch of up to 700% at break load, when wet, is typical.

STATEMENT OF OBJECTS AND FEATURES OF THE INVENTION

It is, therefore, one object of this invention to provide a new and improved sausage casing constituting a fibrous-reinforced polyvinyl alcohol resin film and a method of preparing the same.

Another object of this invention is to provide a new and improved method for preparing polyvinyl alcohol resin sausage casings by impregnation of a saturating tissue fibrous web with an organic solvent solution of a film-forming polyvinyl alcohol resin.

Another object of this invention is to provide a new and improved polyvinyl alcohol resin sausage casing having high strength and low stretch under rewet conditions.

A feature of this invention is the provision of a new and improved sausage casing comprising a tubular, fibrous-reinforced, insolubilized polyvinyl alcohol resin film.

Another feature of this invention is the provision of a new and improved method for the direct preparation of fibrous-reinforced sausage casing by coating and impregnating a saturating tissue, preferably a long fiber hemp paper, formed into a tube with an organic solvent solution of a film-forming polyvinyl alcohol resin and insolubilizing and drying the resin in and on the tissue tube.

Another feature of this invention comprises a new and improved method for the preparation of fibrous sausage casing wherein a saturating tissue is impregnated with an organic solvent solution of a film-forming polyvinyl alcohol resin, the resin is insolubilized in and on the tissue and the tissue subsequently is formed into a tube.

Other objects and features of this invention will become apparent from time to time throughout the specification and claims as hereinafter related.

SUMMARY OF THE INVENTION

This invention comprises a new and improved sausage casing and method of preparing the same. A web of a saturating tissue, preferably a long fiber hemp paper, is impregnated and coated with an organic solvent solution of a film-forming polyvinyl alcohol resin and the impregnated and coated web is suitably treated to insolubilize and dry the polyvinyl alcohol resin as a continuous film. Further insolubilization of the deposited resin by reaction with a cross-linking agent, such as formaldehyde, preferably also is carried out. The cross-linking agent may be incorporated in the impregnating resin solution or brought into contact with the impregnated tissue in a separate treating step. The polyvinyl alcohol-impregnated web directly may be formed into a tubular casing at the time of impregnation and drying or, as a sheet, may be cut to desired width size after drying and the narrower widths formed into tubular casings by a suitable adhesive seaming step. In carrying out this process, it is preferred to use a film-forming polyvinyl alcohol resin having a hydroxyl (OH) group D.S. (degree of substitution—the ratio, expressed herein as a percentage, of the average number of hydroxyl groups in a particular resin per 100 monomeric units) in excess of 20%, and preferably above about 25%, e.g., ranging up to and over 99.99%. The film-forming resins utilized typically further are characterized by a D.P. (degree of polymerization—an average of the total number of monomeric units per molecule in a particular resin) of at least about 800, and more preferably at least about 1000.

BRIEF DESCRIPTION OF THE DRAWINGS

FIG. 2 is a diagrammatic view showing another embodiment of the method of the present invention for the continuous coating of a fibrous web and direct formation of the same into a tubular casing.

BRIEF DESCRIPTION OF THE DRAWINGS EMBODIMENTS

Figure 1:
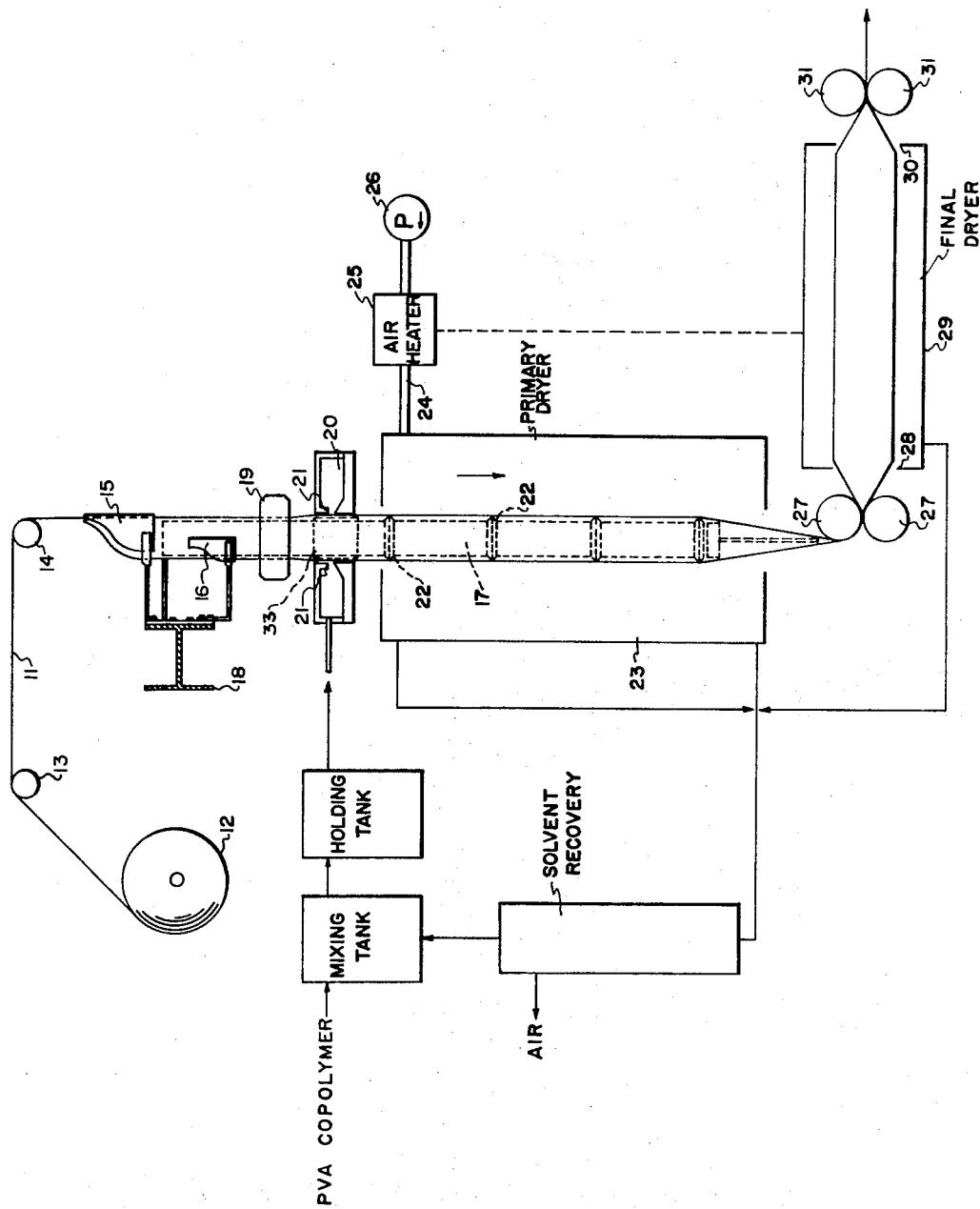
FIG. 1 is a diagrammatic view showing the continuous coating of a fibrous web and formation of the same into a casing in accordance with this invention.

This invention relates to new and useful improvements in sausage casings. In the preferred embodiments of this invention, a film-forming polyvinyl alcohol resin in an organic solvent solution is impregnated in and coated upon a fibrous web of saturating tissue, preferably a long fiber hemp paper.

The phrase "organic solvent soluble polyvinyl alcohol resin," as used herein, is intended to refer to film-forming vinyl polymers having a D.S. with respect to OH groups of at least about 20%. Vinyl alcohol, as a monomer, is not known to exist. All attempts to prepare vinyl alcohol have resulted in the rearrangement of the compound to acetaldehyde. Commercially, polyvinyl alcohol resins normally are prepared by hydrolysis of vinyl polymers containing vinyl aliphatic or aromatic ester units, including vinyl polymers such as polyvinyl ester homopolymers, e.g., polyvinyl acetate, polyvinyl propionate, polyvinyl benzoate, etc.; and carboxylated polyvinyl ester polymers, e.g., those produced by copolymerizing a vinyl ester such as vinyl acetate, vinyl propionate, and vinyl benzoate with an ethylenically unsaturated carboxylic acid such as acrylic acid, methacrylic acid and maleic acid. The extent of the hydrolysis is controlled to produce products having the desired hydroxyl group degree of substitution. Polyvinyl alcohol resins so produced and preferred for use in the present invention have a D.S. with regard to OH group content of at least about 25% and in the range of from about 40% to about 99.99%, the latter figure approximating the maximum hydrolysis efficiency attainable in commercial practice. In the case of resins containing carboxyl groups, the invention contemplates the use of those having a D.S. with regard to carboxyl functionality ranging up to about 25%, preferably in the range of from about 0.1–10%.

For purposes of this invention, it is necessary to use polyvinyl alcohol resins which are film-forming (e.g., D.P. is at least about 800) and having a D.S. of OH groups of at least about 20%. Such resins, as is known, typically have a viscosity of at least about 4 centipoises, e.g., in the range of from about 4 to about 65 centipoises and above, as 4% by weight aqueous solutions at 20° C. as conventionally measured on an Ostwald-Fenske Viscometer. Such properties are necessary to provide suitable solutions impregnating the fibrous saturating tissue web while also providing adequate strength and resistance to moisture to the insolubilized and dried film. In general, solubility goes down while film strength increases with increasing molecular weight and OH group content. Resins having an OH group D.S. above about 95%, for example, while less soluble, provide solutions which form films which are quite resistant to moisture even without cross-linking. Cross-linking, however, does render such and other resins stronger and less sensitive to water and, accordingly, cross-linking of the resin in the film is preferred in the present invention.

The organic solvent in the solutions of polyvinyl alcohol resins utilized in the present invention suitably may be any anhydrous or water-containing organic liquid in which the particular polyvinyl alcohol resin being employed is soluble (e.g., capable of forming viscous solutions useful herein containing 1–40% by weight polyvinyl alcohol resin). Specific solvents preferred for use in given instances depend primarily on the particular polyvinyl alcohol resin employed. For example, polyvinyl alcohol resins having a lower OH group D.S., e.g., those having a D.S. of less than about 80%, have a wide range of solubility, including solubility to varying degrees in anhydrous liquids such as alcohols, e.g., methanol, ethanol, and isopropanol; ethers, e.g., the monomethyl, monoethyl, monobutyl, and diethyl ethers of ethylene glycol and diethylene glycol; ketones, e.g., acetone, methyl ethyl ketone, diacetone alcohol, methyl isobutyl ketone, and cyclohexanone; esters, e.g., ethyl acetate, methyl acetate, and n-butyl acetate; chlorinated compounds, e.g., carbon tetrachloride and ethylene dichloride; hydrocarbons, e.g., benzene and toluene; nitro-compounds, e.g., nitrobenzene; and heterocyclic compounds, e.g., dioxane and tetrahydrofuran, as well as in water-containing miscible liquid mixtures comprising members of said organic liquids. In this latter respect, it will be understood that the phrase "organic solvent" as employed herein embraces miscible mixtures of water and organic liquids containing sufficient levels of organic liquid to modify any solubility characteristics that water displays alone, e.g., when at least 10% by volume of the total solvent is organic. On the other hand, as stated, as the OH group content of the resin increases, resin solubility in general and in hydrophobic liquids, in particular, decreases. Resins of higher OH group D.S., e.g., above about 80%, thus, while soluble to a lesser extent in the above-described solvents, more advantageously are used with the more hydrophilic organic solvents, viz alcohols. Especially useful solvents for utilization with such resins include miscible alcohol-water mixtures having a volume ratio of alcohol:water of at least 0.4:1 and wherein the alcohol is a low molecular weight alkanol, such as methanol or ethanol. The heat-sensitivity of the polyvinyl alcohol resins is another factor which affects solvent selection. It is, of course, desired to avoid having to use elevated temperatures and/or vacuum pressure conditions in finally drying impregnated web produced in the process. Hence, in the more preferred embodiments, an organic solvent is utilized which is a normally volatile liquid, e.g., a liquid having a boiling point (760 mm. Hg) below 100° C.

In accordance with the present invention, the polyvinyl alcohol resin solution may be applied to the web by any of a variety of well known coating techniques. In general, resin solution application is effected by continuously passing a web (e.g., in an upward, downward, or horizontal direction) past and in contact with a suitable resin solution applicator means. The impregnated and coated fibrous web, as stated, may be formed directly into tubular casings or the resultant sheets may be later formed into casings through a seaming operation. In either case, the applied polyvinyl alcohol copolymer is insolubilized on the fibrous web by an effective treatment and then optionally may be, and preferably is, further insolubilized by reaction with a suitable cross-linking agent.

Although the invention broadly embraces the use of any convenient technique which is effective to insolubilize the polyvinyl alcohol resin in and on fibrous webs coated and impregnated with the organic solvent solutions of the resin, the preferred embodiments typically utilize one of several techniques wherein resin insolubilization is effected mainly by a removal of solvent from the resin solution-impregnated web. One such approach involves displacing solvent from the solution-impregnated web by passage of the impregnated web through a coagulation bath such as provided by either aqueous or organic solutions of acids, salts, and mixtures thereof (e.g., sulfuric acid, ammonium sulfate, and combinations thereof) or organic liquids (i.e., nonsolvents) in which the particular resin employed is partially soluble or insoluble and which effect coagulation of the resin. The resins of high OH group D.S., e.g., above about 80%, for example, can be coagulated from alcohol-water solutions impregnated on fibrous webs by passing the webs through a coagulating bath of either a saturated aqueous solution of ammonium sulfate or a liquid (i.e., a nonsolvent) which is more organophilic than the alcohol-water solvent, such as acetone, benzene, and the like.

In other preferred embodiments, particularly those utilizing normally volatile solvents, insolubilization of the resin is effected by evaporation of the solvent. Volatile liquid-containing polyvinyl alcohol resin films blister at elevated temperatures. Accordingly, evaporation of the solvent preferably is effected at moderate temperatures, e.g., on the order of 100°–120° C., although higher temperatures can be employed if contact time is short. Reduced pressures can be utilized if necessary or desirable. By choosing a suitably volatile solvent, however, the need for using vacuum conditions can be eliminated. Heating of the resin-impregnated web can be effected directly or indirectly by convection, radiation, or any other available conventional heating technique. Typically the desired heating is carried out by contacting the web with a heated inert gas such as air.

In applying the polyvinyl alcohol resin to fibrous webs in organic solvent solution, it is preferred to provide a cross-linking agent which will react with the polyvinyl alcohol during drying and heat curing to produce a film upon and within the fibrous web which is insoluble in and relatively insensitive to water. In one preferred technique, a suitably soluble cross-linking agent is incorporated into the resin solution applied to the web and becomes activated during the drying treatment. It is also possible to initially apply the polyvinyl alcohol resin solution and then by means of a spray, bath, or other conventional application technique, separately apply the cross-linking agent to the resin-containing film. Particular cross-linking agents contemplated to be applied to insolubilize the polyvinyl alcohol resin in the present invention include the conventional agents well known to be capable of forming cross-links between molecules of polyvinyl alcohol resins. Specific examples of such materials which contain two or more reactive functional groups per molecule and usually are water-soluble include aldehydes such as formaldehyde, glutaraldehyde, glyoxal, etc.; methylol condensation products including formaldehyde-amine and formaldehyde-amide condensation products, e.g., dimethylol urea, trimethylol melamine, and liquid area-formaldehyde resins; diisocyanates, such as the diisocyanate of dimerized linoleic acid, 4,4'-methylene bis(cyclohexyl isocyanate), etc.; diisothiocyanates, such as the diisothiocyanate of dimerized linoleic acid, 4,4'-methylene bis(cyclohexyl isothiocyanate), etc.; polyepoxides, such as butadiene diepoxide and the like; polyamide epichlorohydrin resin; acyl halides, such as adipoyl chloride, sebacoyl chloride, etc.; and polymeric ketenes, such as the diketene of dimerized linoleic acid. In applying the cross-linking agents to insolubilize polyvinyl alcohol resin, the less reactive cross-linking agents may be applied in admixture with the solution of polyvinyl alcohol resin. In the case of more reactive cross-linking agents, the polyvinyl alcohol resin may be applied to the fibrous web and subsequently treated with the cross-linking agent in a separate treating step, preferably prior to drying and curing. Where necessary or desirable, a catalyst for the cross-linking agent may be added to the system via the resin solution, the cross-linking agent stream, a separate stream, etc.

In preparing casings in accordance with this invention, it is preferred to use a fibrous web comprising a saturating tissue formed of long hemp fibers bonded together with a suitable wet strength sizing agent, such as regenerated cellulose or an insolubilized polyvinyl alcohol resin of high OH group D.S., i.e., greater than about 80%. Other nonwoven webs, such as Yoshino paper, rice paper, paper formed of polyvinyl alcohol resin fibers, hemp, rayon, cotton and nylon; and woven fabrics such as muslin, marquisette, cheese cloth, organdy, and voile can be used. It should be understood that these fibrous webs are commercially available. The long fiber hemp paper (Dexstar paper) is generally preferred for reasons of maximum strength, ease of handling, and economy.

APPARATUS AND PROCESS FOR CASING PREPARATION

Referring to FIG. 1 of the drawings, there is shown a diagrammatic view of an apparatus for coating or impregnating a fibrous web and forming the same into a fibrous casing in accordance with this invention.

In FIG. 1, a ribbon of paper 11, preferably of the type described in U.S. Pat. No. 2,045,349 which is a long fiber hemp paper weighing in the range from 12–16 pounds per ream, depending upon the size and weight of casing being manufactured, passes from roll 12 over rollers 13 and 14 and around formers 15 and 16 which form the paper into tubular form. The paper formed into a tube, then proceeds downwardly over a mandrel 17. Mandrel 17, which is preferably a hollow metal tube, e.g., a steel pipe, having an outside diameter of 2-7 inches, more or less, depending upon the size of the tube or casing which is to be produced, may be of any suitable length, conveniently about 30 feet long, and, as shown, can be suspended from a suitable support such as an I-beam 18 or the like. The paper 11, now shaped in the form of a tube, passes downwardly over mandrel 17, through a forming ring 19 which is preferably a metallic ring having an inside diameter only slightly larger than the diameter of the tube shaped paper passing through it and whose purpose it is to maintain the paper in tubular form until it reaches the coating die 20. Coating die 20 is essentially a hollow ring structure made of metal or the like and contains an annular opening 21 circumferentially of its inside diameter through which an organic solvent solution of polyvinyl alcohol resin, which is contained under positive pressure in the chamber of the die 20, is applied to the outer surface of the downwardly moving paper tube to uniformly impregnate and coat it with polyvinyl alcohol resin solution. The polyvinyl alcohol resin solution is prepared in a mixing tank and supplied to a holding tank from which it is introduced to the die as indicated diagrammatically in FIG. 1.

A sleeve 33 formed of metal or the like which is shrunk onto mandrel 17 functions to effect a more uniform application of polyvinyl alcohol resin solution through the orifice 21 as the paper tube 11 passes downwardly thereover. A number of slip rings 22 which may be shrunk onto the mandrel 17 at suitable intervals, e.g., three feet, and which are made of metal or the like, function to keep the inside wall of the polyvinyl alcohol resin coated and impregnated paper tube from scraping against the outside wall of mandrel 17 as the tube moves downwardly.

The apparatus is arranged with mandrel 17 extending through dryer chamber 23. Dryer chamber 23 is provided with a hot air inlet 24 supplied with air from heater 25 by means of high capacity fan or pump 26. Dryer 23 is effective to produce a rapid preliminary drying of the polyvinyl alcohol resin coated and impregnated fibrous casing.

From the lower end of dryer 23, the dried fibrous casing is collapsed and passes through rolls 27 positioned at the inlet 28 to dryer 29. Dryer 29 is also provided with a pair of rolls 31 adjacent outlet 30 therefrom. Rolls 27 and 31 are effective to trap a "bubble" of air in the casing to maintain it under a desired inflating pressure to prevent the casing from shrinking during drying. Dryer 29 may be supplied with heated air from an alternate heater, not shown, or may be supplied with heated air from air heater 25 as indicated in dotted line. In preparing casing in accordance with this embodiment of the invention, the polyvinyl alcohol resin-impregnated fibrous tube is dried thoroughly in dryer 23 and is cured in dryer 29. The casing is dehumidified to a desired moisture level either by introduction of moist air at the outlet end of the dryer or by subjecting the casing leaving the dryer to storage under moisture equilibration conditions. Solvent vaporized from the casing in dryers 23 and 29 is condensed and recovered for reuse and recirculation in the system in a conventional solvent recovery unit shown diagrammatically FIG. 1.

In FIG. 2, these is shown a diagrammatic view of another embodiment of the present invention for coating and impregnating a fibrous web and directly forming the same into a fibrous casing. The apparatus shown there, at least with regard to the means for forming the paper into a tube and applying the coating and impregnating resin solution, is identical to that of FIG. 1 and, correspondingly, like elements in the tube-forming and solution-coating means of the two apparatus are numbered the same.

In FIG. 2, as in FIG. 1, a ribbon of paper 11, preferably a long fiber hemp paper is fed from roll 12, formed into tubular form around formers 15 and 16, passed downwardly over mandrel 17 and past coating die 20 where an organic solvent solution of polyvinyl alcohol resin is applied to the outer surface of the downwardly moving paper tube to uniformly coat it with said resin solution.

In FIG. 2, mandrel 17 extends into container 123 which contains a coagulating bath 124, e.g., aqueous or organic liquid bath containing a coagulating concentration of an acid, salt, or organic nonsolvent liquid for the resin, for insolubilizing and regenerating a polyvinyl alcohol resin film within and upon the fibrous web. The mandrel 17 may be provided with an inlet pipe or conduit 125 and an outlet pipe or conduit 126 for conveying coagulating liquid into and out of the interior of the tubular casing formed in the apparatus. The inside flow of coagulating liquid is at a rate sufficient to maintain a liquid level within the formed tube which is approximately equal to the level of bath 124 in container 123.

At the bottom of container 123 there is provided a roller 127. The casing is flattened in the bottom of the container 123 and passes around roller 127 and out of the coagulation and regeneration bath. Casing 128 (as distinguished from the untreated paper 11 at the inlet end of the process) passes out of the coagulation bath and over a series of rollers which guide it into and out of a series of treating baths. Containers 130 and 140 through which the casing is guided contain additional coagulating liquid 131 and 141, respectively, to ensure complete insolubilization of resin in the casing. From container 140 the casing is passed through tank 150 which contains a quanitity of wash liquid 151 for washing out coagulating liquid and any by-product materials from the casing. In tank 160 the casing is contacted with a bath 161 containing a plasticizer (e.g., glycerol) and a crosslinking agent (e.g., formaldehyde) for the polyvinyl alcohol resin film. The casing then is guided by rollers out of tank 160 to the entrance to dryer 154 where it passes between rollers 155 and 156 which, in conjunction with rollers 158 and 159 at the exit end of dryer 154, inflate the casing 128 by air pressure to form an enlarged trapped bubble of air as indicated at 157 to place the casing in a condition in which it can be dried without excessive shrinkage accurring. In dryer 154, the casing is heated by air circulated through line 171 from heater 170 by pump 172. From dryer 154, the casing passes to storage reels (not shown).

While the arrangement for preparing polyvinyl alcohol resin coated and impregnated fibrous casing shown in FIGS. 1 and 2 have the advantage of utilizing more or less standard equipment for the manufacture of cellulosic fibrous casings, the apparatus and procedures shown in FIGS. 3-8 have the advantage of higher speed operation. In FIGS. 3-8 of the drawing, there are shown several different embodiments of flat web coaters for coating and impregnating a fibrous saturating tissue web with a polyvinyl alcohol resin solution and drying means for same. In each case, the coated web, immediately after or after storage is on reels, is slit to size and formed into tubular casing using conventional apparatus for forming and seaming longitudinally seamed tubes. The casing may be formed and seamed using any conventional adhesive for a polyvinyl alcohol resin film. Such adhesives include molten plasticized polyvinyl alcohol resins of high OH D.S., e.g., above about 80%, polyvinyl alcohol resin aqueous or organic solvent solutions, or reactive adhesives such as isocyanate, epoxy or similar adhesives constituting aqueous or organic solutions of di- or polyfunctional materials, such as those listed above, which cross-link polyvinyl alcohol resins.

Figure 3:
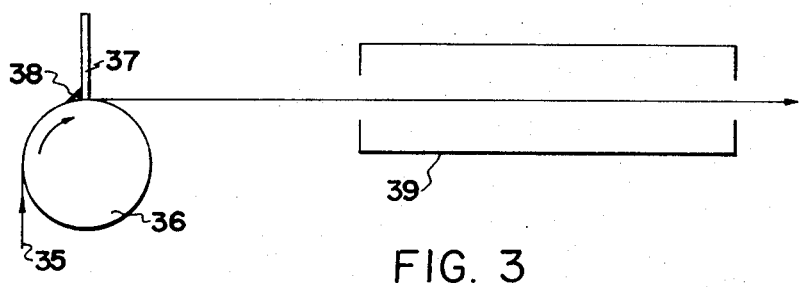
FIG. 3 is a diagrammatic view showing the application of polyvinyl alcohol resin solution to a fibrous web on a knife over roll coater.

In FIG. 3, there is illustrated a knife over roll type coater for use in applying polyvinyl alcohol resin solutions to a fibrous web in accordance with this invention. A fibrous web 35, preferably a long fiber hemp paper or other saturating tissue, is fed over coating roll 36. A viscous solution of polyvinyl alcohol resin is applied to the upper surface of the web as indicated at 38 and metered by coating knife 37. The resultant coated and impregnated web passes through dryer 39 where the polyvinyl alcohol resin is thoroughly dried to a film and cured and may be moisture equilibrated by introduction of moisture at a selected portion of the outlet end of the dryer. Alternatively, the coated, dried and cured web coming out of dryer 39 may be subjected to a separate moisture equilibration step prior to reeling.

Figure 4:
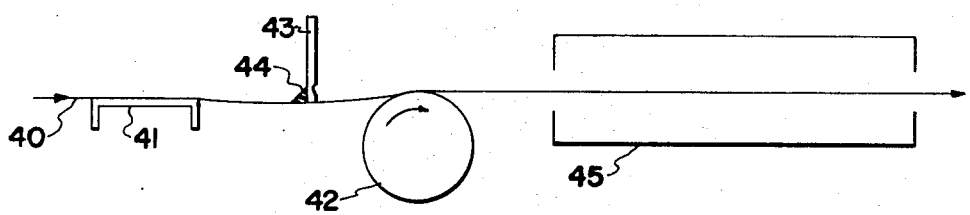
FIG. 4 is a diagrammatic view showing the application of a polyvinyl alcohol resin solution to a fibrous web using a floating doctor blade coater.

In FIG. 4, there is illustrated a floating doctor blade or air knife type coater for application of polyvinyl alcohol resin to a fibrous saturating tissue web. Fibrous web 40 is passed over support channel 41 and idler roll 42. A floating doctor blade or air knife 43 is positioned between channel 41 and roll 42 and meters a viscous polyvinyl alcohol resin solution 44 onto web 40. The thus coated and impregnated web 40 is then passed through dryer 45 where the resin is thoroughly dried to a film, cured, and preferably re-equilibrated with moisture. If desired, the moisture equilibration may be carried out in a separate step after the dryer. The floating doctor blade or air knife coater is operative primarily at low speed coatings and impregnation of nonwoven webs because of the relatively low wet strength of the web. This type coater is more effective for woven fabrics or for nonwoven webs which have been provided with a substantial loading of a wet strength additive.

Figure 5:
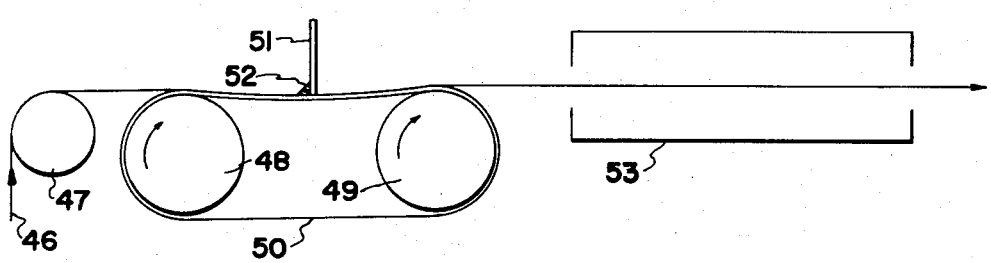
FIG. 5 is a diagrammatic view showing the application of polyvinyl alcohol resin solution to a fibrous web using a continuous blanket knife coater.

In FIG. 5, there is shown a modified type of floating doctor blade or air knife coater known as a continuous blanket knife coater. This apparatus is applicable to coating and impregnating nonwoven webs at higher speeds since the web is supported at the point of application of the coating liquid and the doctor blade. In FIG. 5, the nonwoven saturating tissue web 46 is introduced over idler roll 47. The apparatus includes idler roll 48 and drive roll 49 over which there is fed a continuous belt or blanket 50 for supporting the web being coated. Web 46 is supported by blanket 50 at the point of application of a viscous polyvinyl alcohol resin coating solution 52 which is doctored onto the web by doctor blade or coating knife 51. The coated and impregnated web is passed through dryer 53 where it is dried, cured, and preferably moisture equilibrated. If desired, the re-equilibration with moisture may take place in a separate step following the dryer.

Figure 6:
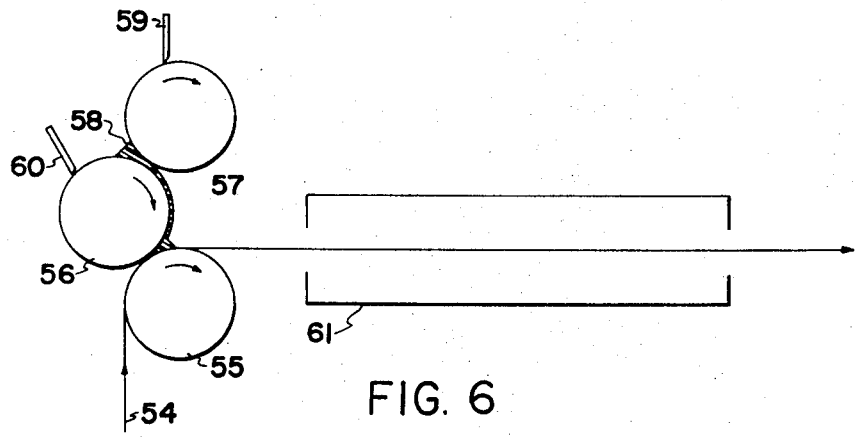
FIG. 6 is a diagrammatic view showing the application of polyvinyl alcohol resin solution to a fibrous web in a reverse roll coater.

In FIG. 6, there is shown a conventional three-roll, reverse roll coater used here for applying polyvinyl alcohol resin solution to a fibrous web. In this coater, fibrous web 54 is passed over a support roll 55 which is arranged for vertical adjustment to control thickness of coating applied. Adjacent to support roll 55 there is positioned a variable speed transfer roll 56 and doctor roll 57 which is preferably provided with a micrometer adjustment for controlling thickness of film. Doctor roll 57 is provided with a cleaning knife 59 and transfer roll 56 is provided with cleaning knife 60. The viscous coating solution is introduced between rolls 56 and 57 as shown at 58. In this apparatus, the coating material 58 is applied in a control thickness to transfer roll 56, the thickness being controlled by doctor roll 57. The coating from transfer roll 56 is transferred to web 54 which then passes into dryer 61. In dryer 61, the coated and impregnated web is thoroughly dried and cured and preferably re-equilibrated with moisture. If desired, the moisture equilibration may be carried out in a separate step beyond the dryer.

Figure 7:
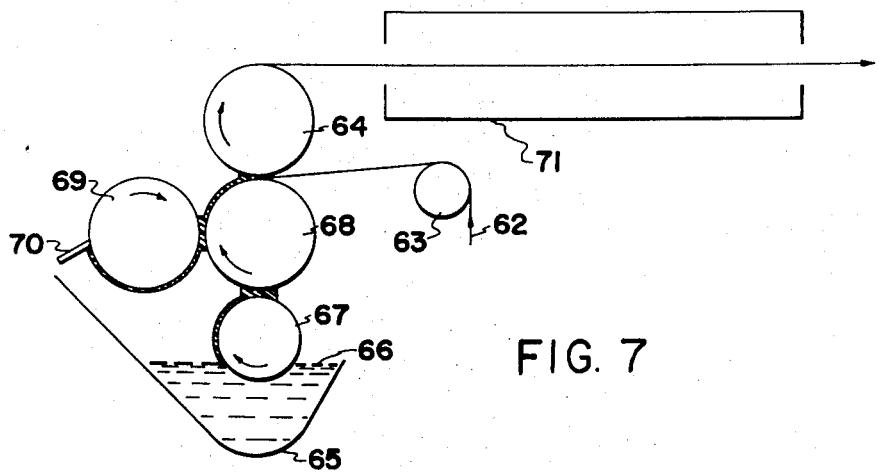
FIG. 7 is a diagrammatic view showing the application of polyvinyl alcohol resin solution to a fibrous web in a contracoater.

In FIG. 7, there is shown a conventional four-roll reverse roll coater, also known as a contracoater, which can be employed in the present invention for applying polyvinyl alcohol resin solution to a fibrous web. The fibrous web 62 is fed over an idle roll 63 and around transfer roll 64. The apparatus includes a container 65 for the coating solution 66, viz a viscous organic solvent solution of polyvinyl alcohol resin. A fountain roll 67 is arranged to pick up coating solution 66 and apply it to a transfer roll 68. Adjacent to transfer roll 68 there is positioned a metering roll 69 which controls the thickness of film layer on transfer roll 68 for application to the fibrous web 62. Metering roll 69 is provided with doctor blade 70 for cleaning the surface thereof. After the web is coated by transfer roll 68, the coated and impregnated web passes into dryer 71 where it is thoroughly dried and cured and preferably re-equilibrated with moisture. If desired, the cured polyvinyl alcohol resin film-impregnated web may be re-equilibrated with moisture in a separate conditioning step subsequent to the dryer.

Figure 8:
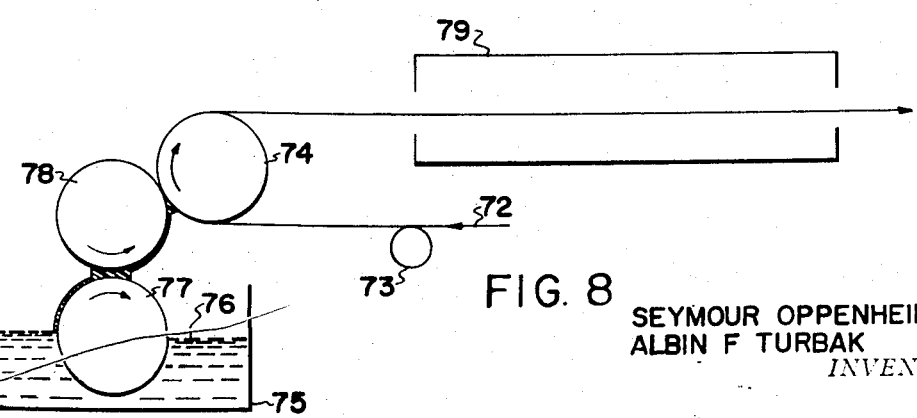
FIG. 8 is a diagrammatic view showing the application of polyvinyl alcohol resin solution to a fibrous web in a three-roll, direct roll coater.

In FIG. 8, there is shown a three-roll direct roll coater for applying polyvinyl alcohol resin solution to a fibrous web. In this apparatus, the fibrous web 72 passes over guide roll 73 and around drive roll 74. The apparatus is provided with a container or receptacle 75 in which the coating solution 76, viz a viscous organic solvent solution of polyvinyl alcohol resin, is positioned. Fountain roll 77 is positioned in coating solution 76 and is arranged upon rotation to apply the coating solution to transfer roll 78 which applies it to the surface of web 72 as the web passes around drive roll 74. The resultant coated and impregnated web is passed into dryer 79 where it is thoroughly dried and cured and preferably is re-equilibrated with moisture. If desired, the moisture re-equilibration may take place in a separate treating step subsequent to the dryer.

PREPARATION OF POLYVINYL ALCOHOL RESIN FIBROUS CASINGS

A series of experiments were carried out in which a fibrous web was coated and impregnated with a viscous polyvinyl alcohol resin solution and dried and seamed to form a fibrous casing. In these experiments, different polyvinyl alcohol resin compositions were evaluated and different plasticizers used to demonstrate the range of operability of the invention. The casing may be prepared at the time of impregnation of the fibrous web as described in connection with FIGS. 1 and 2 of the drawings or the fibrous web may be coated and impregnated by any of the procedures shown in FIGS. 3-8 of the drawings and subsequently seamed into fibrous casing using any of the well known adhesives for polyvinyl alcohol resins.

The following nonlimiting examples are illustrative of the scope of this invention.

Example 1

In this example, a fibrous sausage casing is prepared directly by impregnating and coating a fibrous paper with a polyvinyl alcohol resin solution.

A 10% copolymer solution in a 30:70 (v./v.) mixture of methanol and water is prepared using a polyvinyl alcohol/polyvinyl acetate copolymer having an OH group content of 99.5% and a D.P. of about 900. The polyvinyl alcohol copolymer is dissolved in the solvent mixture at about 90–95° C. To this solution, after cooling, there is added 2.25% glycerol as a copolymer plasticizer, 0.4% formaldehyde as a copolymer cross-linking agent, and 0.22% lactic acid as a catalyst for the cross-linking agent.

A ribbon of 15-lb. Dexstar long fiber hemp paper is removed from a storage roll and passed through an apparatus as shown in FIG. 1 and as described above. The paper is formed into a tube and the viscous polyinvyl alcohol resin solution is introduced through annular die 20 to saturate and coat the paper tube. Resin solution is applied at a rate corresponding to provide wet tube thickness of about 50 mils. As the tube passes downward through dryer 23, it is dried in air heated to 120° C. An air stream containing solvent vapor is withdrawn from dryer 23 and the solvent is condensed in a solvent recovery area removed from the dryer as described above. The tube then passes into curing oven 29 where it is cured at 140° C. to effect a thorough cross-linking of the film and to collapse the film to effect hydrogen bonding between substituents of the polyvinyl alcohol copolymer molecules. After curing, the polyvinyl alcohol copolymer casing is subjected to a humid atmosphere to remoisten the casing for flexibility and ease of handling.

After drying and moisture equilibrium (to about 12%) under controlled humidity conditions, the casing has a thickness of about 4–6 mils. When the casing is rewet by soaking in water, it swells to a thickness of about 6–8 mils. The casing has greater break strength and displays less elongation at break as compared to fibrous reinforced regenerated cellulose casing.

A polyvinyl alcohol copolymer-fibrous casing prepared as described above is first soaked in hot water and then stuffed with a bologna emulsion. The casing is tied at one end with a string and after thorough stuffing is closed at the other end with a Tipper clip. The casing is subjected to a normal cooking and smoking operation. There is no breakage of the casing observed and moisture and smoke penetration are about the same as a conventional fibrous cellulosic casing. The casing shows less than 3/16 in. variation in circumference for a 15 in. circumference casing as measured from end to end of a fully stuffed and processed bologna sausage.

Example 2

A 10% solution of a polyvinyl alcohol/polyvinyl acetate copolymer having an OH group D.S. of 95% and a D.P. of about 1000 is prepared following the general procedure described in Example 1, excepting a 30:70 (v./v. mixture of tetrahydrofuran and water is substituted as the solvent and 0.5% of a polyamide epichlorohydrin resin (Kymene 557) is substituted for the formaldehyde-lactic acid curing agent combination. The viscous polyvinyl alcohol copolymer solution thus prepared is applied to a 15-lb. Dexstar long, fiber hemp paper on a knife over roll coater as shown in FIG. 3 and described above to provide a coated and impregnated paper having a wet thickness of about 50 mils and the coated web is dried under conditions similar to those used in Example 1. When dried, the paper has a thickness of about 4–6 mils. The paper has a rewet thickness of about 6–8 mils and a rewet strength and an elongation at break characteristics superior to corresponding cellulose impregnated paper.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing, a 10% aqueous solution of polyvinyl alcohol/ polyvinyl acetate copolymer (OH group D.S. of about 99.5), plasticized with glycerol and containing formaldehyde and lactic acid is applied as a seaming adhesive. As the adhesively seamed joint is formed, the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of Example 1.

Example 3

Another methanol-water solution of a polyvinyl alcohol/polyvinyl acetate copolymer having an OH group D.S. of about 88% and a D.P. of about 1200 is prepared following the general procedure described in Example 1. The sodium comprises 10% of the polyvinyl alcohol resin, 2.25% glycerol, 0.4% formaldehyde and 0.22% lactic acid. The viscous polyvinyl alcohol copolymer solution thus prepared is applied to a 15-lb. Dexstar long fiber lamp hemp paper on a floating doctor blade coater as shown in FIG. 4 and described above to provide a coated and impregnated paper having a wet thickness of 50 mils and the paper dried as before. When dried, the paper has a thickness of about 4–6 mils. The paper has a rewet thickness of about 6–8 mils and rewet strength and an elongation at break properties similar to the paper of Example 2.

The impregnated, dried and cured paper is equilibrated with sufficient moisture to render it flexible and easy to handle by passing through a humid atmosphere. The impregnated paper is slit to the desired size, for any particular casing, and is formed, using the adhesive of Example 2, into a continuous tube on a standard sealer for forming longitudinal seams. As the adhesively seamed joint is formed, the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of Example 1.

Example 4

Following the general procedure of Example 1, a solution is prepared of a polyvinyl alcohol/polyvinyl acetate copolymer having an OH group D.S. of about 70% and a D.P. of about 1500, excepting methyl ethyl ketone is substituted as the solvent. The resin solution, which contains glycerol, formaldehyde and lactic acid in the proportions described in Example 1, is applied to a 15-lb. Dexstar long fiber hemp paper on a continuous blanket knife coater as shown in FIG. 5 and described above to provide a coated and impregnated paper having a wet thickness of 50 mils. When dried as in the previous examples, the paper has a thickness of about 4–6 mils. The paper has a rewet thickness of about 6–8 mils and rewet strength and an elongation at break properties similar to the papers of the preceding examples.

The impregnated, dried and cured paper is equilibrated with sufficient moisture to render it flexible and easy to handle by passing through a humid atmosphere. The impregnated paper is slit to the desired size, for any particular casing, and is formed, using the copolymer adhesive of Example 2, into a continuous tube on a standard sealer for forming longitudinal seams in the manufacture of tubing. As the adhesively seamed joint is formed, the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of Example 1.

Example 5

Following the general procedure described in Example 1, a solution is prepared of a polyvinyl alcohol/polyvinyl acetate copolymer having an OH group D.S. of 50% and a D.P. of about 1400, excepting methyl acetate is substituted as the solvent and 0.3% malic acid is substituted for lactic acid as the cross-linking agent catalyst. The glycerol, formaldehyde and malic acid containing resin resolution thus prepared is applied to a 15-lb. Dexstar long fiber hemp paper on a three-roll reverse roll coater as shown in FIG. 6 and described above to provide a coated and impregnated paper having a wet thickness of 50 mils. When dried, the paper has a thickness of about 4–6 mils. The paper has a rewet thickness of about 6–8 mils and rewet strength and elongation at break properties similar to the papers of the previous examples.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing, a 30% acetone solution of 2,4-toluene diisocyanate (or other isocyanate adhesive) is applied as a seaming adhesive. As the adhesively seamed joint is formed, the casing is heated to dry the adhesive and effect a tight seam.

The casing which is formed does not tend to break across the seam when subjected to routine tensile tests.

The fibrous casing prepared in this example performs adequately when stuffed, cooked, and smoked as described in connection with the casing of Example 1.

Example 6

Following the general procedure described in Example 1, a solution is prepared of a polyvinyl alcohol/polyvinyl acetate copolymer having an OH group D.S. of about 30% and a D.P. of about 1800, excepting benzene is substituted as the solvent and 0.5% glutaraldehyde is substituted for the formaldehyde-lactic acid cross-linking agent combination. The glycerol- and glutaraldehyde-containing polyvinyl alcohol resin solution thus prepared is applied to a 15-lb. Dexstar long fiber hemp paper on a four-roll reverse roller coater as shown in FIG. 7 and described above to provide a coated and impregnated paper having a wet thickness of 50 mils. When dried, the paper has a thickness of about 4–6 mils. The paper has a rewet thickness of about 6–8 mils and rewet strength and elongation at break properties similar to the paper of the previous examples.

The impregnated, dried and cured paper is equilibrated with sufficient moisture to render it flexible and easy to handle by passing through a humid atmosphere. The impregnated paper is slit to the desired size, for any particular casing, and is formed in a continuous tube on a standard sealer for forming longitudinal seams in the manufacture of tubing. In the manufacture of this tubular casing, 30% acetone solution of butadiene diepoxide is applied as a seaming adhesive. As the adhesively seamed joint is formed, the casing is heated to dry the adhesive and effect a tight seam. The casing which is formed does not tend to break across the seam when subjected to routine tensile tests.

The fibrous casing prepared in this example performs adequately when stuffed, cooked, and smoked as described in connection with the casing of Example 1.

Example 7

Another methanol-water solution is prepared of a polyvinyl alcohol/polyvinyl acetate copolymer having an OH group D.S. of 99.5% and a D.P. of about 1000 following the procedure described in Example 1, excepting the formaldehyde and lactic acid previously added are replaced by 1.25% trimethylol melamine and 0.2% citric acid. The viscous polyvinyl alcohol resin solution thus prepared is applied to a 15-lb. Dexstar long fiber hemp paper on a three-roll direct roll coater as shown in FIG. 8 and described above to provide a coated and impregnated paper having a wet thickness of 50 mils. When dried, the paper has a thickness of about 4–6 mils. The paper has a rewet thickness of about 6–8 mils and rewet strength and elongation at break characteristics similar to the paper of the previous examples.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this casing, a 30% acetone solution of the diketone of dimerized linoleic acid is applied as a seaming adhesive. As the adhesively seamed joint is formed, the casing is heated to dry the adhesive and effect a tight seam. The casing which is formed does not tend to break across the seam when subjected to routine tensile tests.

The fibrous casing prepared in this example performs adequately when stuffed, cooked, and smoked as described in connection with the casing of Example 1.

Example 8

Another methanol-water solution is prepared of a polyvinyl alcohol resin having an OH group D.S. of 99.5% and a D.P. of about 1100 following the procedure described in Example 1, excepting the glycerol, formaldehyde, and lactic acid previously added are omitted. The viscous polyvinyl alcohol copolymer solution thus prepared is applied to a 15-lb. Dexstar long fiber hemp paper in an apparatus as shown in FIG. 2 and described above wherein the paper is formed into a tube, and the resin solution is applied to the tube through annular die 20 to provide a wet tube thickness of about 50 mils. The polyvinyl alcohol resin is insolubilized in coagulating baths 124, 131, and 141 of acetone. The resultant tube then is passed through water bath 151 for rinsing and through bath 161 constituting an aqueous solution comprising 30% glycerol, 1% formaldehyde, and 0.2% lactic acid. From bath 161, the tube is passed through dryer 154 where cross-linking and drying are completed.

Casing which has a thickness of about 4–6 mils is equilibrated with sufficient moisture to render it flexible and easy to handle. Rewet in water, the casing swells to a thickness of 6–8 mils. It has greater heat strength, displays less elongation at break than conventional reinforced cellulose casing, and performs adequately when stuffed, cooked, and smoked as described in Example 1.

Example 9

Following the general procedure of Example 1, a 10% polyvinyl alcohol resin solution in methyl ethyl ketone is prepared using as the resin a terpolymer (D.P. of 1200) obtained by hydrolysis of a copolymer of vinyl acetate and maleic acid to an OH group D.S. of about 80% and a carboxylic acid (maleic acid) group D.S. of about 5%. Glycerol, formaldehyde, and lactic acid are added to the resin solution in the proportions set out in Example 1, and the casing forming procedure described in Example 1 is repeated using the resultant resin solution as the coating and impregnating resin.

The resultant fibrous casing prepared has strength, stuffing, cooking and smoking properties substantially similar to the casings of the preceding examples.

In the several examples given above, the polyvinyl alcohol resin was provided with glycerol as a plasticizer. In carrying out the preparation of casings in accordance with this invention, any plasticizer may be used which is suitable for producing a flexible film. Glycerol is the most widely used plasticizer for polyvinyl alcohol resin films, but in general high boiling, water-soluble organic compounds containing hydroxyl, amide, or amino groups may be used. Specific examples of other suitable plasticizers include monomers, such as ethylene glycol, propylene glycol, sorbitol, formamide and urea, and polymers, such as polyethylene glycols (e.g., average molecular weight, 400–1000), and other polyoxyethylene derivatives of the aforementioned monomers (e.g., those containing 4–20 ethylene oxide units per molecule).

In the several examples given above, the polyvinyl alcohol resin is provided with one of formaldehyde, glutaraldehyde, a modified polyamide-epichlorohydrin resin, and trimethylol melamine as the cross-linking agent. Similar results, however, are obtained by substituting in the processes of the examples any of the other cross-linking agents specifically described herein above.

The paper used in the above examples was a long fiber hemp paper. In general, any saturatable web, woven or nonwoven, of suitable strength can be used. In some cases, a small amount of a surfactant or wetting agent may be added either before treatment or in admixture with the polyvinyl alcohol resin coating solution to effect a more thorough penetration of the polyvinyl alcohol resin solution in the web.

Any preliminary or final drying and curing of the coated and impregnated web, either as flat stock or as a casing, may be carried out in a single or a plurality of treatments, e.g., solvent impregnated product may be heated for about one minute or more at 90–120° C. and then cured by heating to a higher temperature, e.g., 140° C. more or less, for about three minutes or more, care preferably being taken to avoid heating the polyvinyl alcohol resin film itself to above about 100°–120° C. The precise heating and curing times and temperatures employed are dependent upon the concentration of the polyvinyl alcohol resin coating solution and at least partially upon the OH group D.S. of the copolymer. The conditions, in any event, are selected to effect thorough drying and curing of the deposited polyvinyl alcohol resin film.

In preparing casings in accordance with this invention, conventional adjuvants, where desired, also suitably may be added. Colored casings, for example, may be produced by incorporating F.D.A. and U.S.D.A. approved pigments in the polyvinyl alcohol resin coating solution. In particular, aluminum lake pigments of F.D.A. approved food dyes may be used. The invention further embraces the addition to the polyvinyl alcohol resin film coating of minor amounts, e.g., up to about 20% by weight, of other film-forming resins, e.g., polyvinyl acetate, amylose, cellulose, etc., provided such resins are compatible with the polyvinyl alcohol resin utilized.

The tubular casings produced in accordance with this invention are useful primarily for processing and packaging sausages such as bologna, etc. These casings may also be used for packaging food and other products. The casings are also useful as semipermeable membranes for purification of water by reverse osmosis and as hemodialysis membranes in artificial kidney machines.

Other embodiments which do not part from the spirit and scope of the present invention, of course, will be apparent to those skilled in the art. Accordingly, it will be understood the present invention is to be limited only by the scope of the appended claims.

What is claimed is:

1. A synthetic sausage casing comprising a tube of a long fiber saturating tissue longitudinally seamed and saturated and coated with a continuous polyvinyl alcohol copolymer resin film deposited from an organic solvent solution and insolubilized in and on said saturating tissue, said polyvinyl alcohol copolymer resin having a degree of polymerization of at least about 800 and a degree of substitution with regard to hydroxyl groups of at least 20%.

2. The synthetic sausage casing according to claim 1 wherein the polyvinyl alcohol copolymer resin film contains a plasticizing agent.

3. The synthetic sausage casing according to claim 1 wherein said deposited polyvinyl alcohol copolymer resin is characterized by a degree of substitution with regard to hydroxyl groups in the range of from about 25% to about 99.99% and a degree of polymerization of at least about 800 and is a polyvinyl alcohol/polyvinyl ester copolymer or a carboxylated polyvinyl alcohol/polyvinyl ester resin having a degree of substitution with regard to carboxyl groups ranging up to about 25%.

4. The synthetic sausage casing according to claim 3 wherein the polyvinyl alcohol copolymer resin film contains a plasticizing agent.

5. A method of preparing a synthetic sausage casing comprising saturating and coating a long fiber saturating tissue with an organic solvent solution of a film-forming polyvinyl alcohol copolymer resin having a degree of polymerization of at least about 800 and a degree of substitution with regard to hydroxyl groups of at least 20%, removing solvent from the resultant resin saturated tissue to deposit and insolubilize the polyvinyl alcohol copolymer resin as a continuous film in and on said saturating tissue, cross-linking said polyvinyl alcohol copolymer resin, and forming said tissue into a tube having a longitudinally extending and adhesively bonded seam.

6. The method of preparing a synthetic sausage casing according to claim 5 wherein said deposited polyvinyl alcohol copolymer resin is characterized by a degree of substitution with regard to hydroxyl groups in the range of from about 25% to about 99.99% and a degree of polymerization of at least about 800 and is a polyvinyl alcohol/polyvinyl ester copolymer or a carboxylated polyvinyl alcohol/polyvinyl ester resin having a degree of substitution with regard to carboxyl groups ranging up to about 25%.

7. The method of preparing a synthetic sausage casing according to claim 5 wherein said long fiber saturating tissue is in the form of a tube when saturated and coated by said polyvinyl alcohol copolymer resin solution.

8. The method of preparing a synthetic sausage casing according to claim 6 wherein said insolubilized resin film-impregnated saturating tissue is a flat sheet and is formed into a tube having a longitudinally extending and adhesively bonded seam.

9. The method of preparing a synthetic sausage casing according to claim 6 wherein a plasticizing agent is incorporated into said polyvinyl alcohol copolymer resin film.

10. The method of preparing a synthetic sausage casing according to claim 5 wherein said long fiber saturating tissue is in the form of a tube when impregnated and coated by said polyvinyl alcohol copolymer resin solution.

11. The method of preparing a synthetic sausage casing according to claim 5 wherein said insolubilized resin film-impregnated long fiber saturating tissue is a flat sheet which is formed into a tube having a longitudinally extending and adhesively bonded seam.

12. The method of preparing a synthetic sausage casing according to claim 5 wherein a plasticizing agent is incorporated into said polyvinyl alcohol copolymer resin film.

References Cited

UNITED STATES PATENTS

| | | | |
|---|---|---|---|
| 2,210,436 | 8/1940 | Weingand | 117—94 X |
| 2,251,296 | 8/1941 | Shipp | 260—91.3 UA |
| 2,993,825 | 7/1961 | Gage | 161—88 X |
| 3,061,458 | 10/1962 | Arguette | 260—91.3 UA |
| 3,135,613 | 6/1964 | Underwood | 99—176 |
| 3,348,997 | 10/1967 | Lagolly | 260—91.3 UA |
| 3,262,905 | 7/1966 | Martins | 260—45.7 P |
| 3,505,264 | 4/1970 | Thoese | 260—91.3 UA |
| 3,516,960 | 6/1970 | Martins | 99—176 X |

FOREIGN PATENTS

| | | | |
|---|---|---|---|
| 386,161 | 1/1933 | Great Britain | 99—176 |

FRANK W. LUTTER, Primary Examiner

R. HALPER, Assistant Examiner

U.S. Cl. X.R.

117—94; 161—247; 260—91.3 UA